US011636041B2

(12) United States Patent
Nayak et al.

(10) Patent No.: US 11,636,041 B2
(45) Date of Patent: Apr. 25, 2023

(54) OBJECT STORAGE DATA STORAGE SYSTEMS AND METHODS

(71) Applicant: Seagate Technology LLC, Fremont, CA (US)

(72) Inventors: Deepak Nayak, Pune (IN); Hemant Mohan, Pune (IN)

(73) Assignee: Seagate Technology LLC, Fremont, CA (US)

( * ) Notice: Subject to any disclaimer, the term of this patent is extended or adjusted under 35 U.S.C. 154(b) by 20 days.

(21) Appl. No.: 17/068,183

(22) Filed: Oct. 12, 2020

(65) Prior Publication Data

US 2022/0114095 A1    Apr. 14, 2022

(51) Int. Cl.
*G06F 12/10*    (2016.01)
*G06F 12/06*    (2006.01)

(52) U.S. Cl.
CPC .......... *G06F 12/10* (2013.01); *G06F 12/0638* (2013.01); *G06F 2212/211* (2013.01); *G06F 2212/213* (2013.01); *G06F 2212/261* (2013.01)

(58) Field of Classification Search
CPC ........................... G06F 12/10; G06F 2212/261
See application file for complete search history.

(56) References Cited

U.S. PATENT DOCUMENTS

| | | | |
|---|---|---|---|
| 4,309,569 A | 1/1982 | Merkle | |
| 4,464,713 A | 8/1984 | Benhase et al. | |
| 5,438,674 A | 8/1995 | Kelle et al. | |
| 6,108,006 A | 8/2000 | Hoppe | |
| 7,478,221 B1 | 1/2009 | Karr et al. | |
| 7,627,617 B2 | 12/2009 | Kavuri et al. | |
| 8,369,092 B2 | 2/2013 | Atkins et al. | |
| 10,037,369 B1* | 7/2018 | Bono | G06F 16/164 |
| 10,565,230 B2 | 2/2020 | Zheng et al. | |
| 10,678,480 B1* | 6/2020 | Armangau | G06F 3/0659 |
| 2002/0001175 A1 | 1/2002 | Unrein | |
| 2002/0099918 A1 | 7/2002 | Avner et al. | |
| 2003/0079156 A1 | 4/2003 | Sicola et al. | |
| 2004/0103086 A1 | 5/2004 | Vinnokota et al. | |
| 2005/0108292 A1 | 5/2005 | Burton et al. | |
| 2010/0205369 A1* | 8/2010 | Chang | G06F 12/0866 |
| | | | 711/E12.019 |
| 2011/0276776 A1* | 11/2011 | Ylonen | G06F 12/0292 |
| | | | 711/E12.001 |
| 2012/0158682 A1 | 6/2012 | Yarnell et al. | |
| 2014/0019706 A1 | 1/2014 | Kanfi | |
| 2017/0286312 A1* | 10/2017 | Shapiro | G06F 3/0619 |
| 2017/0308473 A1 | 10/2017 | Bassi | |

(Continued)

OTHER PUBLICATIONS

Logical Block Addressing by Socc (Year: 2018).*

(Continued)

*Primary Examiner* — Paul M Knight
(74) *Attorney, Agent, or Firm* — Faegre Drinker Biddle & Reath LLP

(57) ABSTRACT

A system includes memory and one or more processors programmed to operate a logical layer, a media link layer, and a slot layer. The logical layer is configured to send and receive object data to a host according to an object storage protocol. The media link layer is configured to map the object data to virtual media addresses. The slot layer is configured to map the virtual media addresses to physical addresses of data storage devices.

20 Claims, 13 Drawing Sheets

(56) References Cited

U.S. PATENT DOCUMENTS

| | | | |
|---|---|---|---|
| 2018/0074746 A1* | 3/2018 | Watanabe | G06F 3/061 |
| 2018/0107592 A1* | 4/2018 | Hashimoto | G06F 3/0679 |
| 2019/0065557 A1* | 2/2019 | Boles | G06F 16/2462 |
| 2019/0332329 A1 | 10/2019 | Qui et al. | |
| 2022/0066931 A1* | 3/2022 | Ray | G06F 12/0875 |

OTHER PUBLICATIONS

Transition to Advanced Format 4KSector Hard Drives by Seagate (Year: 2017).*
Tapes Changing Role in Data Protection by Schulz (Year: 2008).*
What is a Client? What is a Server? AndWhat is a Host? by LearnTomato (Year: 2014).*
How virtual address is translated to disk address? by Fsasm (Year: 2016).*
Concurrent Log Structured Memory for Many Core Key Value Stores by Merrit (Year: 2017).*
EvenDB: Optimizing Key-Value Storage for Spatial Locality by Gilad (Year: 2020).*
NVMe key-value storage vs. block and object storage by Peterson (Year: 2020).*

* cited by examiner

OBJECT STORAGE DATA STORAGE SYSTEMS AND METHODS

SUMMARY

In certain embodiments, a system includes memory and one or more processors programmed to operate a logical layer, a media link layer, and a slot layer. The logical layer is configured to send and receive object data to a host according to an object storage protocol. The media link layer is configured to map the object data to virtual media addresses. The slot layer is configured to map the virtual media addresses to physical addresses of data storage devices.

In certain embodiments, an enclosure includes sub-enclosures positioned at different levels along the enclosure. The enclosure further includes data storage devices positioned within the sub-enclosures. The data storage devices including at least one hard disk drive, at least one solid-state drive, and at least one magnetic tape drive.

In certain embodiments, a method is disclosed as including receiving a key-value pair of data, splitting the key-value pair of data into chunks, assigning each chunk to a type of storage media, splitting the chunks into fragments, assigning each fragment a virtual address, and assigning each virtual address a physical address on a data storage device.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
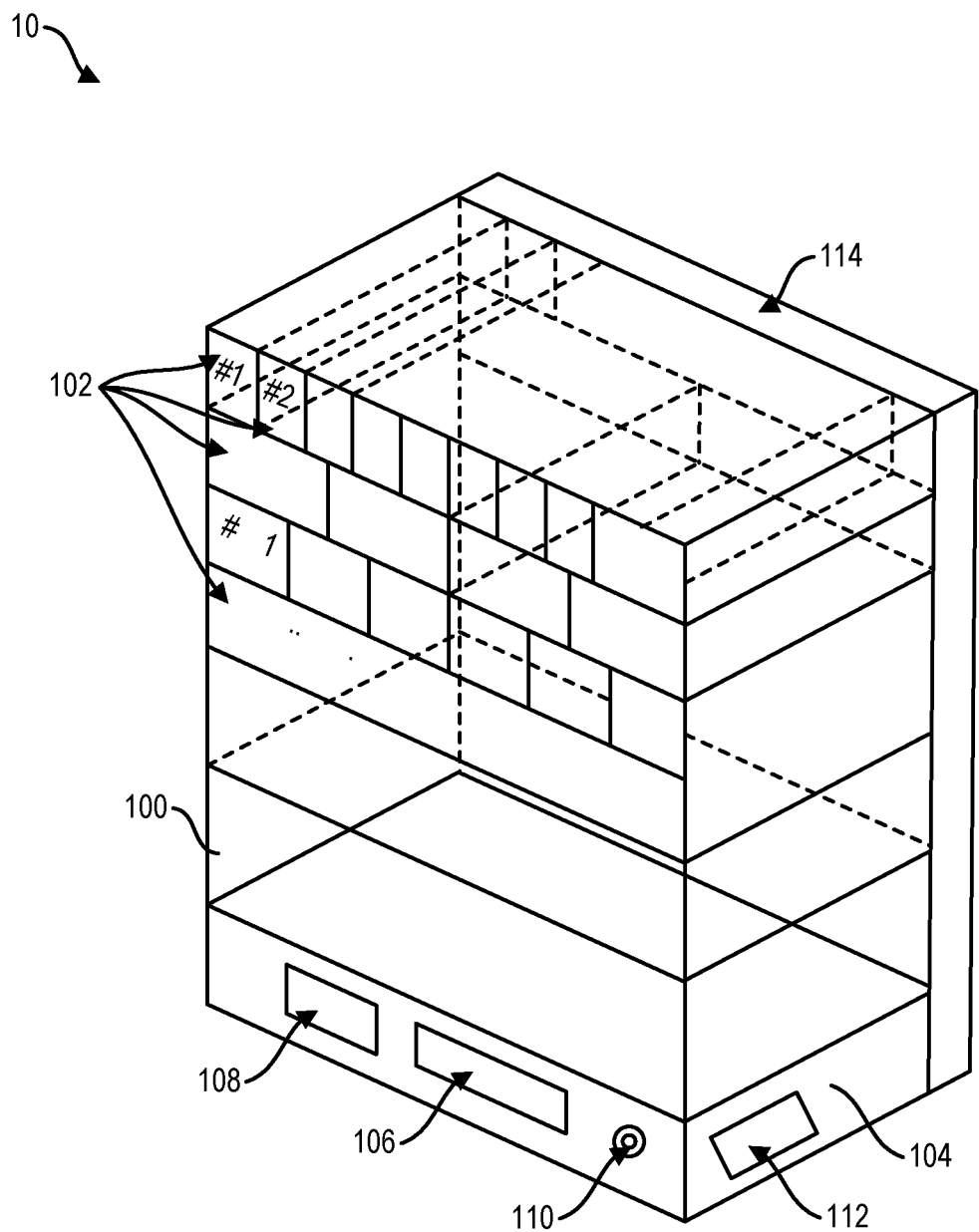
FIG. 1 shows a data storage system, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

The demand for cloud data storage services continues to grow, resulting in vast amounts of data being stored to private clouds and public clouds. This demand will continue to grow as more internet-of-things (IoT) devices are activated and connected to cloud data storage systems.

Some of the data stored to the cloud is used for archival purposes, where the data is rarely altered, if ever. This data may be referred to be write-once-read-many (WORM) data or "cold" data. To reduce the cost (e.g., initial capital investment, supplying electricity) of storing such data, the data can be written to lower-cost types of data storage media such as magnetic tape. However, this approach may involve storing or passing the data through multiple separate data storage systems before the data reaches the lower-cost media. Certain embodiments of the present disclosure are accordingly directed to data storage systems that store data on multiple types of data storage media and that include an architecture that provides capabilities for writing and retrieving data from the multiple types of data storage media.

Data Storage System and Enclosure

FIG. 1 shows a schematic of a data storage system 10 with an enclosure 100 or cabinet that houses various sub-enclosures 102. As will be discussed in more detail below, the sub-enclosures 102 can house different types of data storage media.

The enclosure 100 also includes a controller sub-enclosure 104 that houses components such as power supplies 106, control circuitry 108, memory 110, and one or more interfaces 112 for transferring data signals and communications signals to and from the data storage system 10. For example, the data storage system 10 may be communicatively coupled to a host, which sends data and control commands to the data storage system 10. The host can be a physically separate data storage system.

The data storage system 10 can include a back-plane printed circuit board 114 that extends along the back of the enclosure 100. In certain embodiments, the data storage system includes only a single back-plane printed circuit board 114. The back-plane printed circuit board 114 communicates data signals, command signals, and power (e.g., DC power) to and from each of the sub-enclosures 102 and the controller sub-enclosure 104. For example, the back-plane printed circuit board 114 can include various conductive traces (e.g., copper traces) that transfer the various signals. In embodiments with a single back-plane printed circuit board 114, all data, command, and power signals would flow through the back-plane printed circuit board 114. In certain embodiments, the back-plane printed circuit board 114 does not extend or only partially extends behind sub-enclosures 102 that require air movers (e.g., fans) to pull air through the sub-enclosure 102 to cool the electrical components positioned in the sub-enclosure 102. For example, the back-plane printed circuit board 114 may include cutouts or openings to allow air to pass through for cooling purposes.

Figure 2:
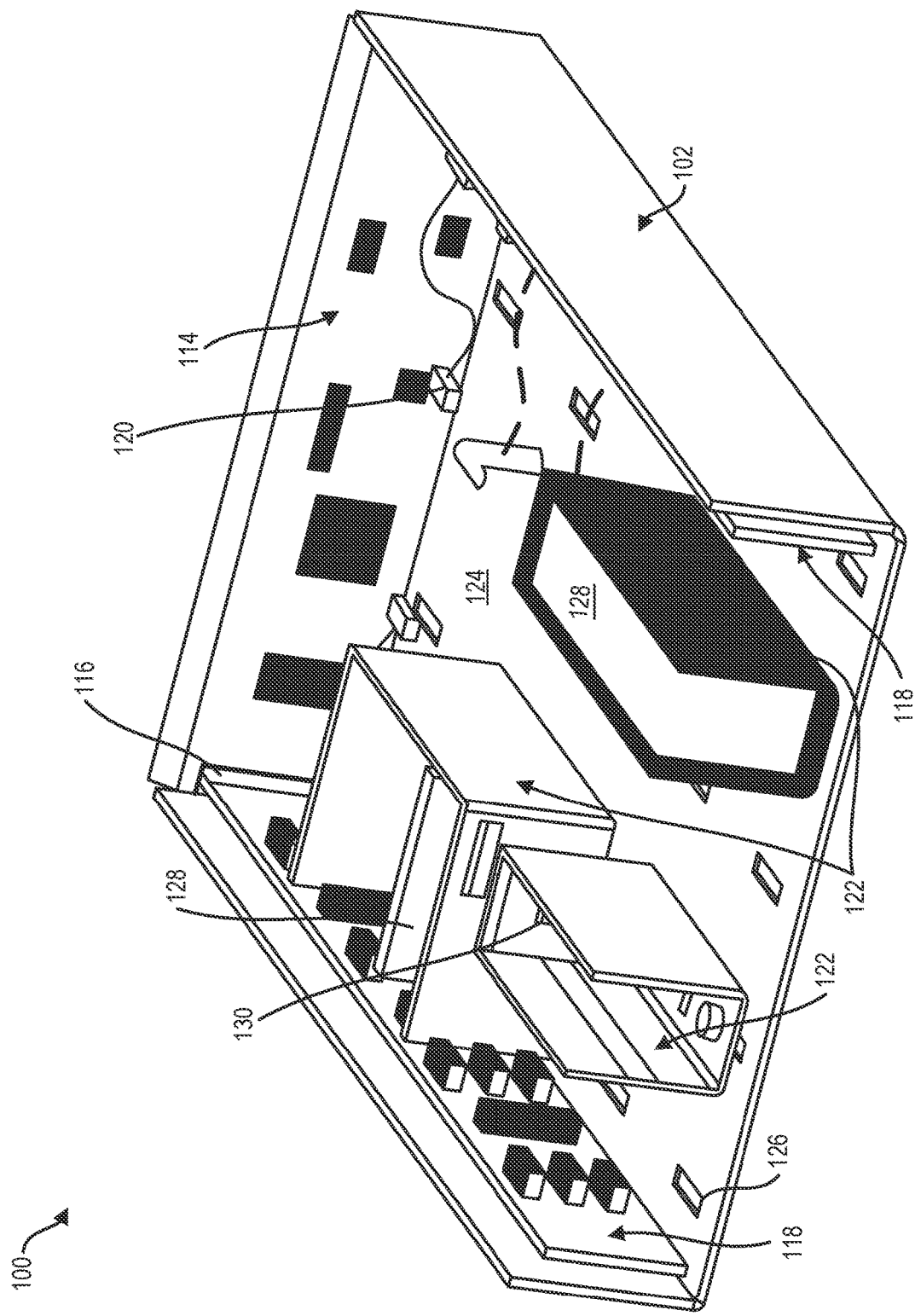
FIG. 2 shows a schematic perspective view of a sub-enclosure of the data storage system of FIG. 1, in accordance with certain embodiments of the present disclosure.

FIG. 2 shows a schematic of one of the sub-enclosures 102 within the enclosure 100. In certain embodiments, the sub-enclosure 102 can include a drawer-like structure that can be slid into and out of the enclosure 100 such that an operator can access the sub-enclosure 102 and its components. In other embodiments, the sub-enclosure 102 is stationary although individual components can be moved into and out of the sub-enclosure 102.

FIG. 2 shows the sub-enclosure 102 with a portion of the back-plane printed circuit board 114 extending at the back of the sub-enclosure 102. The back-plane printed circuit board 114 includes or is coupled to electrical connectors 116 that are electrically and mechanically coupled between the back-plane printed circuit board 114 and side-plane circuit boards 118. As shown in FIG. 2, the side-plane printed circuit boards 118 extend along the sides of the sub-enclosure 102 and include or are coupled to various electrical connectors 120. The data signals, control signals, and power signals from the back-plane printed circuit board 114 can be distributed among the side-plane printed circuit boards 118 and eventually to data storage devices positioned within the sub-enclosure 102.

The sub-enclosure 102 includes cages 122, and the cages 122 are coupled to a floor 124 of the sub-enclosure 102. As shown in FIG. 2, the floor 124 includes openings or slots 126 at different points along the floor 124. The slots 126 allow the configuration of the sub-enclosure 102 to be customized or modular. For example, the slots 126 are positioned such that different sized cages 122 can be incorporated and secured within the sub-enclosure 102. The cages 122 can also include slots or holes with similar spacing to the slots 126 such that fasteners can extend through the slots/holes of the cages 122 and the slots 126 in the floor 124 and couple or secure the cages 122 to the floor 124. Although the slots 126 are shown as extending along a single direction, the slots 126 can be various shapes including but not limited to "×" or "+" shaped to allow multiple degrees of freedom for coupling and positioning cages 122 and other components to the floor 124.

The cages 122 are sized to house one or more data storage devices 128. For example, one cage may house one or more hard disk drives, another cage may house a magnetic tape drive, and another cage may house a solid-state drive. In certain embodiments, one or more of the cages 122 can house multiple of the same type of data storage device. For example, one or more of the cages 122 may essentially form what is sometimes referred to as "Just a Bunch Of Drives" (JBODs). Other example data storage devices 128 include optical data storage devices such as optical discs (e.g., CDs, DVDs, LDs, BluRays, archival discs). The cages 122 allow the sub-enclosures 102 to be modular such that the sub-enclosures 102 can include different types of data storage devices.

Each cage 122 can include an interface 130 (e.g., electrical connector) that is sized to connect with the designed type of data storage device 128. For example, for cages 122 that are intended to function with hard disk drives, the cages 122 can include interfaces 130 that work with hard disk drive protocols such as SATA and SAS interfaces, among others. The interfaces 130 can be electrically and communicatively coupled to the electrical connectors 120 coupled to the side-plane printed circuit boards 118. Other example interface protocols include PCIe, SCSI, NVMe, CXL, Gen-Z, etc.

Because the enclosure 100 and individual sub-enclosures 102 can include multiple types of data storage devices 128 that utilize different protocols for transferring data, power, and commands, the enclosure 100 and individual sub-enclosures 102 may include various adapters and/or converters. These adapters and/or converters can translate or convert data, control, and power signals between or among different data storage protocols. In certain embodiments, the adapters and/or converters are placed between the data storage devices 128 and the back-plane printed circuit board 114 such that the back-plane printed circuit board 114 needs to only handle signals that follow a single protocol. In addition to the adapters and/or converters, the enclosure 100 can include other electronic and communication devices such as switches, expanders, and the like.

Data Storage Architecture

Figure 3:
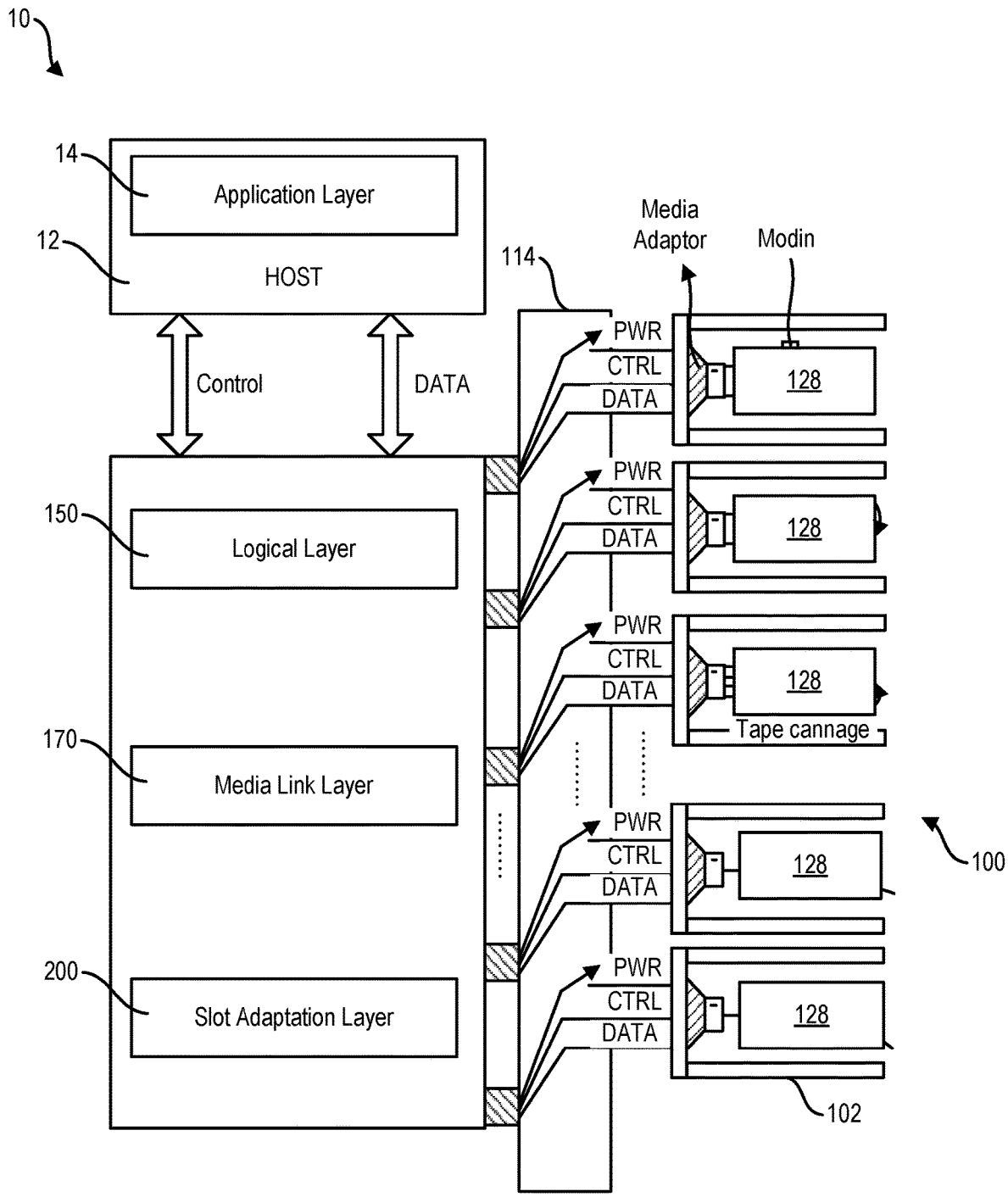
FIGS. 3 and 4 show schematics of the data storage system's software architecture, in accordance with certain embodiments of the present disclosure.
Figure 4:
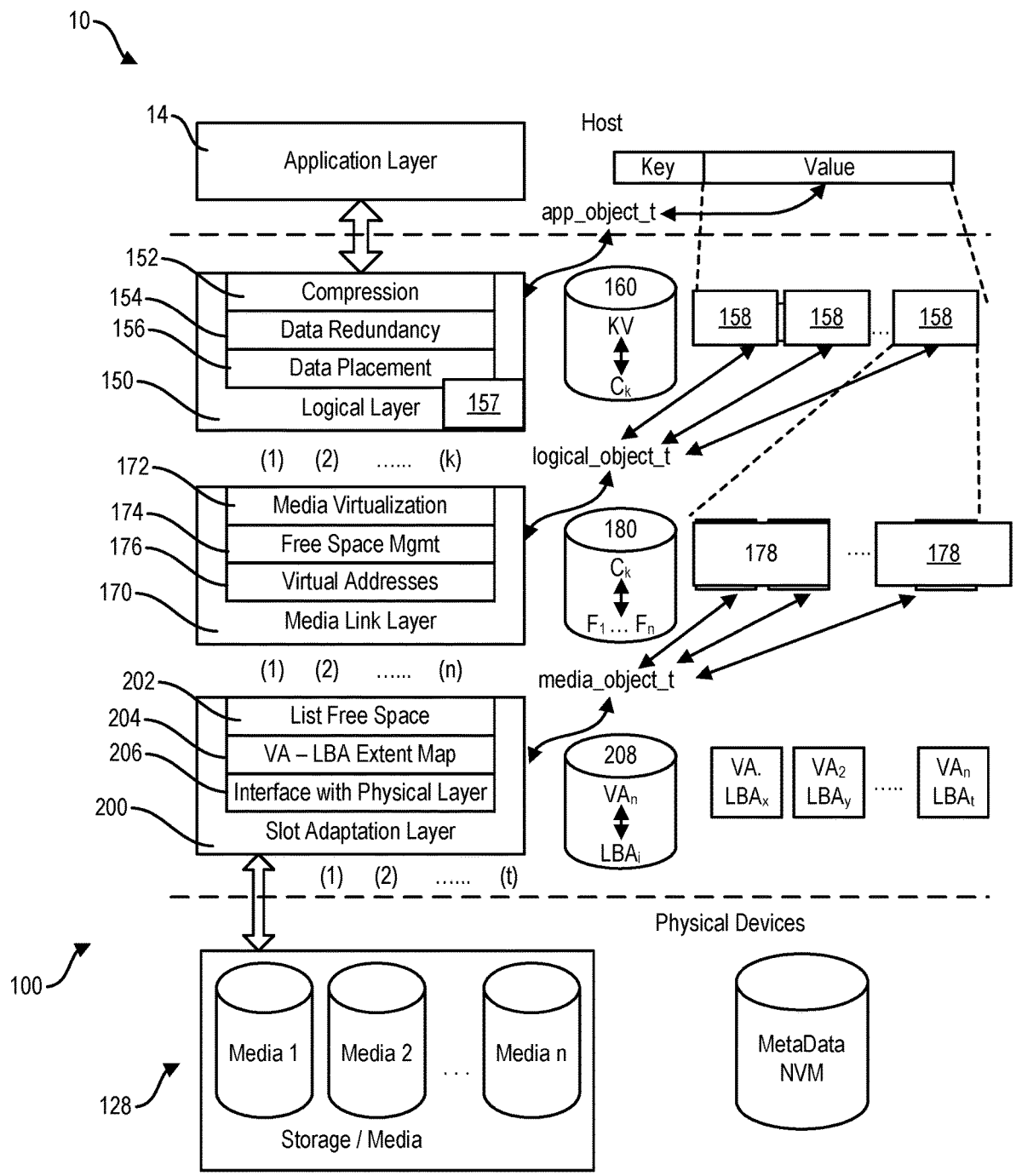

FIGS. 3 and 4 show schematics of the data storage system's data storage or software architecture. In certain embodiments, the data storage system 10 is an object-storage data storage system that is programmed to receive and send data structure using object-storage protocols. Object storage protocols utilize what are referred to as key-value pairs to store, organize, and retrieve data—as opposed to file-folder-like directories—which will be described in more detail below. Although the description below focuses on object-storage approaches, the features of the enclosure 100 can utilize other data storage approaches.

The data storage system 10 includes a host 12, which is communicatively coupled to the enclosure 100 but physically separate from the enclosure 100. The host 12 includes and operates an application layer 14. The host 12 can include its own data storage devices, memory, processors, interfaces, and the like to operate the application layer 14. The application layer 14 is programmed to interact with the enclosure 100 in terms of key-value pairs.

Figure 5:
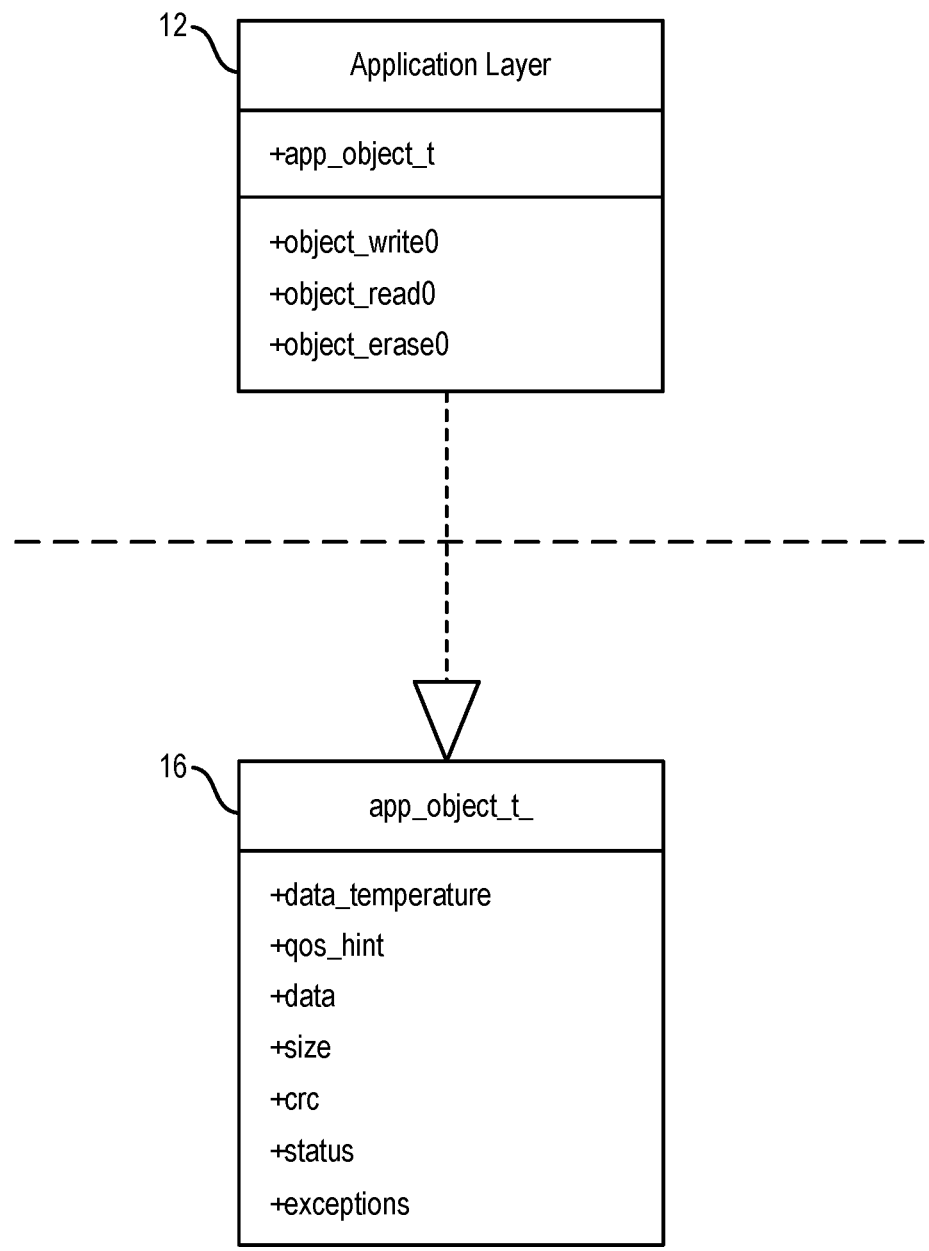
FIGS. 5-8 show various data structures used by the data storage system, in accordance with certain embodiments of the present disclosure.

FIG. 5 shows a schematic of an example of a data structure 16 that can be packaged in a key-value pair 18 and sent to the enclosure 100. The data structure 16 is referred to as "app_object_t" in FIG. 5. The data structure 16 can include information (e.g., metadata) that indicates parameters or characteristics of the data to be sent. The information in the data structure 16 can include the data temperature, quality of service (QoS) hint, size or amount of data, status, and exceptions related to the data. This data structure 16 along with the data itself can be sent to the enclosure 100. In addition to the data structure 16, the host 10 via the application layer 12 can send control commands such as read, write, and erase commands.

Referring back to FIGS. 3 and 4, the enclosure 100 includes multiple software layers that are used for organizing and processing data sent and requested by the host 10. Each layer can include its own memory (e.g., RAM) for cache and longer-term data storage. For example, each layer can include memory dedicated for quickly processing "in-flight" data as it is received by the layer and other memory dedicated to storing one or more databases associated with the layer.

These layers can be stored and operated by the control circuitry 108 and memory 110 of the controller sub-enclosure 104 portion of the enclosure 100. As will be described in more detail below, the data received by the enclosure 100 is passed through each layer before ultimately being stored on one or more of the data storage devices 128 in the enclosure 100.

Logical Layer

Referring to FIG. 4, the layer of the enclosure 100 that interacts directly with the host 10 is referred to as a logical layer 150. The logical layer 150 includes logic or programming for data compression and decompression 152, data redundancy 154, data placement 156, and data encryption 157. The logical layer 150 can use various techniques to compress data sent to the enclosure 100 for storage and decompress data retrieved from the enclosure 100. The data encryption 157 logic can encrypt incoming data that is in-flight as well as at-rest. In certain embodiments, the data encryption 157 logic decrypt data retrieved by one of the data storage devices 128.

The logical layer 150 can also apply techniques to create multiple copies of the incoming data such as RAID and erasure coding techniques. For write operations, the logical layer 150 can create a replica of the incoming data, perform a parity check, and send the replicated data to distinct data storage devices 128. For read operations, the logical layer 150 can reconstitute the original data and confirm fidelity of the reconstituted data with the parity check.

The logical layer 150 also determines which type of data storage device 128 that the incoming data will be sent. In certain embodiments, the logical layer 150 does not, however, determine which specific data storage device 128 will receive or retrieve the data. The determination of which type of storage media to use can be based, at least in part, on information from the data structure 16 received by the logical layer 150. As noted above, the data structure 16 includes information such as data temperature (e.g., data indicating frequency of access) and quality of service hints. The determination of which storage media type to store the incoming data can also be based on which types of data storage devices 128 have enough capacity (e.g., free space) given the size of the incoming data.

In certain embodiments, the logical layer 150 attempts to store incoming data to the type of data storage device that is best suited for the incoming data. For example, incoming data associated with a "low" temperature (e.g., infrequently accessed data) can be stored to lower-cost, higher-capacity data storage devices 128 such as devices with optical media or magnetic tape media, as opposed to solid-state drives or hard disk drives storage media types. In some embodiments, after initially assigning data to a particular media type, the logical layer 150 can identify data that has not been accessed for a predetermined amount of time or that has been frequently accessed and reassigns that data to a more appropriate storage media type.

The logical layer 150 is configured to split the incoming key-value pair data into multiple separate sets of data 158 before the sets of data 158 are sent to the next layer within the stack. To distinguish these sets of data 158 with other described with respect to the other layers, the sets of data 158 will be referred to as "chunks 158" and are represented by "logical_object_t" in FIG. 6.

Each chunk 158 is given a unique chunk_id number by the logical layer 150. The chunk_id numbers monotonically increase as more chunks 158 are created. The chunk_id numbers are stored in a database 160 associated with the logical layer 150. The database 160 also stores a mapping between the chunk_id and the key value associated with the chunk_id. In certain embodiments, chunks 158 created from the same key-value pair can be stored to different data storage devices 128 and even different types of storage media.

Figure 6:
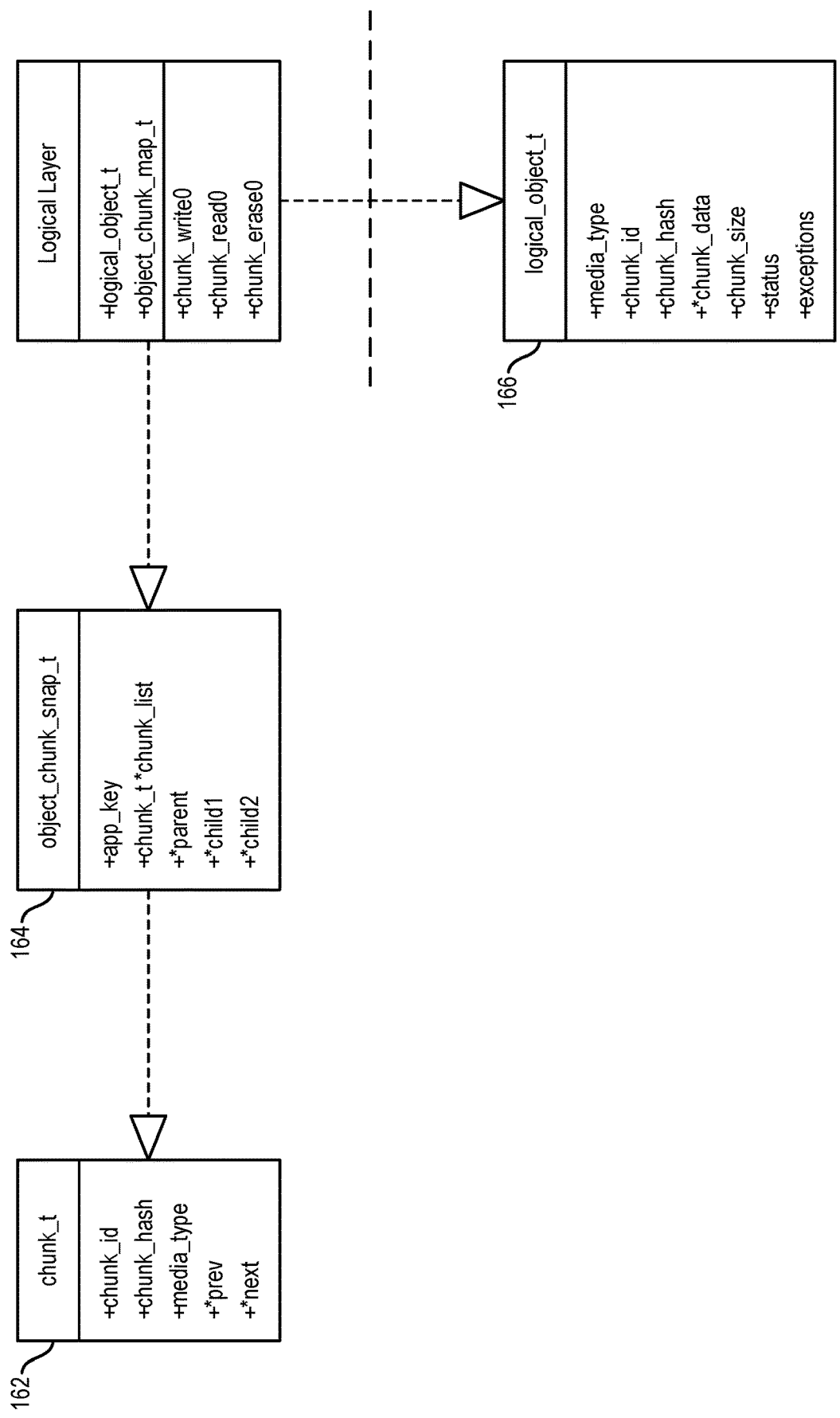

FIG. 6 shows various data structures created and used by the logical layer 150. A database data structure 162 includes high-level information about each chunk_id. For example, the database data structure 162 can include information such as the chunk_id number itself, a hash, and media type associated with that chunk_id number. The mapping data structure 164 includes information about which key value is associated with a given chunk_id. The database data structure 162 and the mapping data structure 164 are stored in the database 160.

The chunk package data structure 166 (referred to as "logical_object_t" in FIG. 6) includes additional information (e.g., metadata) about the data ultimately to be stored to one or more of the data storage devices 128. This information can include the size or amount of data, status, and exceptions related to the data. The data structure 166 along with the data itself can be sent to the next layer in the stack.

Media Link Layer

Referring back to FIG. 4, the next layer is referred to as a media link layer 170. The media link layer 170 includes logic or programming for media virtualization 172, free space management 174, and virtual addressing 176.

The media virtualization 172 logic functions to virtualize or group together data storage devices 128 having the same media type. For example, the media virtualization 172 logic may create an abstraction layer that groups all of the hard disk drives of the enclosure 100 such that the hard disk drives appear as a single data storage device to the logical layer 150 and media link layer. The media virtualization 172 logic can do the same for all solid-state-media-based data storage devices, optical-media-based data storage devices, and magnetic-tape-media-based data storage devices. As such, when the logical layer 150 determines what type of media one of the chunks 158 should be stored, the logical layer 150 does not necessarily need to determine which specific data storage device 128 will be storing the data. As will be described in more detail below, each different virtual storage media is represented by an instance of "hybrid_device_t" in FIG. 7, and the different types of media are represented by "media_type_desc_t" in FIG. 7.

The free space management 174 logic determines and coordinates how much free space is available on the virtual storage media. For example, when the enclosure 100 is initially started or sometimes periodically during operation, the media link layer 170 can query the slot layer (described further below) and request information about how much storage capacity is available for each of the types of storage media. The available capacities of each type of storage media can be compiled and represented as the total available capacity for each virtual storage media. As such, the media link layer 170 can provide information to the logical layer 150 about which types of media are available for storage and how much capacity is available for each type of storage media. This information can be provided without the logical layer 150 or media link layer 170 needing to keep track of individual data storage devices 128 and their available capacity.

Working in conjunction with the media virtualization 172 logic and the free space management 174 logic, the virtual addressing 176 logic organizes the virtual media and where data is stored on the virtual media. In certain embodiments, before being given a virtual address and sent to the next layer in the stack, the chunks 158 of data are further split into smaller sets of data. To distinguish these sets of data 178 with others sets described with respect to the other layers, the sets of data 178 will be referred to as "fragments 178" and are represented by "media_object_t" in FIG. 7. In certain embodiments, each fragment 178 has a size that is equivalent to the size of a block and/or sector format of one or more of the data storage devices 128. For example, the data storage device 128 may have block and/or sector sizes of 512 bytes or 4000 bytes, and so the fragments 178 would likewise have a size of 512 bytes or 4000 bytes.

Each fragment 178 is given a unique virtual address by the media link layer 170. The virtual addresses are stored in a database 180 associated with the media link layer 170. The database 180 also stores a mapping between the assigned virtual addresses and respective chunk_ids.

Figure 7:
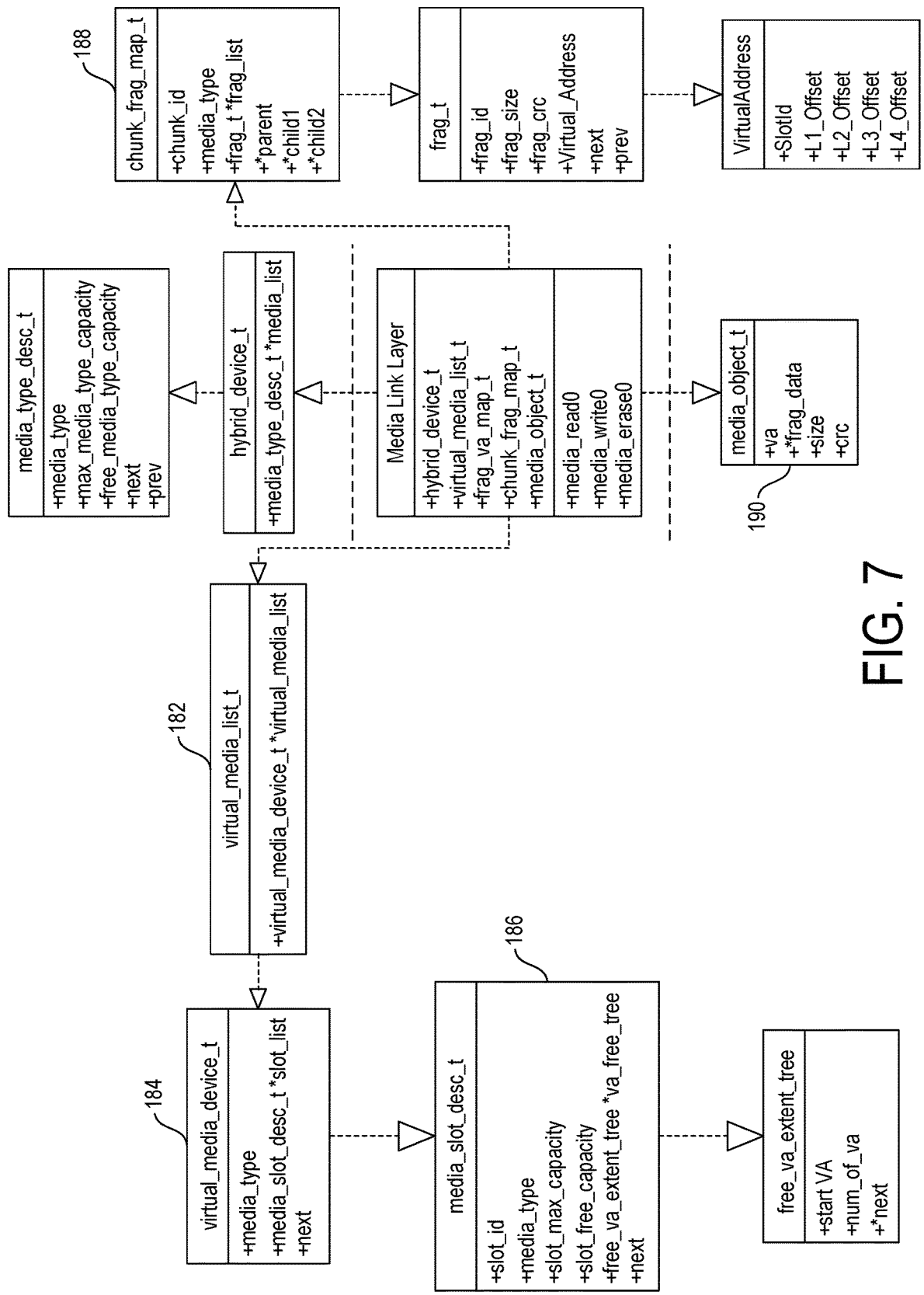

FIG. 7 shows various data structures created and used by the media link layer 170, some of which have already been introduced and described above. The media link layer 170 utilizes a list 182 of the created virtual storage media. A data structure 184 is created for each virtual storage media and includes information (e.g., type of storage media) about that media. Another data structure 186 stores information received by the slot adaption layer about individual data storage devices 128 (sometimes referred to as "slots") and their available capacity. As mentioned above, a mapping of the fragments' virtual addresses and the chunk_ids is stored, and that mapping can be stored according to another data structure 188.

A fragment package data structure 190 (referred to as "media_object_t" in FIG. 7) includes additional information (e.g., metadata) about the data ultimately to be stored to one or more of the data storage devices 128. This information can include the assigned virtual address and size or amount of data. The data structure 190 along with the data itself can be sent to the next layer in the stack.

Slot Layer

Referring back to FIG. 4, the next layer is referred to as a slot layer 200. The slot layer 200 can also be referred to as the data storage device layer. The slot layer 200 includes logic or programming for free space calculations 202, virtual address to physical mapping 204, and hardware interfacing 206. As noted above, each data storage device 128 may be referred to as a slot. In short, the slot layer 200 abstracts individual data storage devices for the upper layers and maps virtual addresses to physical addresses on the individual data storage devices.

The free space calculations 202 logic queries the data storage devices 128 to collect and list how much available capacity is available for each data storage device 128. Each data storage device 128 in the list can be associated with a storage media type. As part of querying the data storage devices 128 for available capacity, other information can be collected such as each device's status, properties, health, etc. In certain embodiments, each data storage device 128 stores product information, which is information about the individual device itself. The product information can include information regarding the type of media, storage protocol, and unique product identification number.

The virtual address to physical mapping 204 (hereinafter "VA-LBA mapping 204" for brevity) receives the virtual address assigned to each of the fragments 178 by the media link layer 170 and determines which data storage device 128 the fragment 178 should be stored. Further, the VA-LBA mapping 204 determines and assigns physical addresses for the virtual addresses. For example, if the virtual address given to a fragment 178 is associated with the virtualized hard disk drives, the slot layer 200 will assign the fragment 178 to a logical block address (LBA) in one of the hard disk drives in the enclosure 100. For optical data storage devices, the slot layer 200 will assign the fragment 178 to a sector on an optical disk.

The hardware interfacing 206 logic interfaces with the individual data storage devices 128. For example, the hardware interfacing 206 logic can include or have access to device drivers and/or hardware abstraction layers that enable the slot layer 200 to communicate with the different types of data storage devices 128 and among different protocols.

Figure 8:
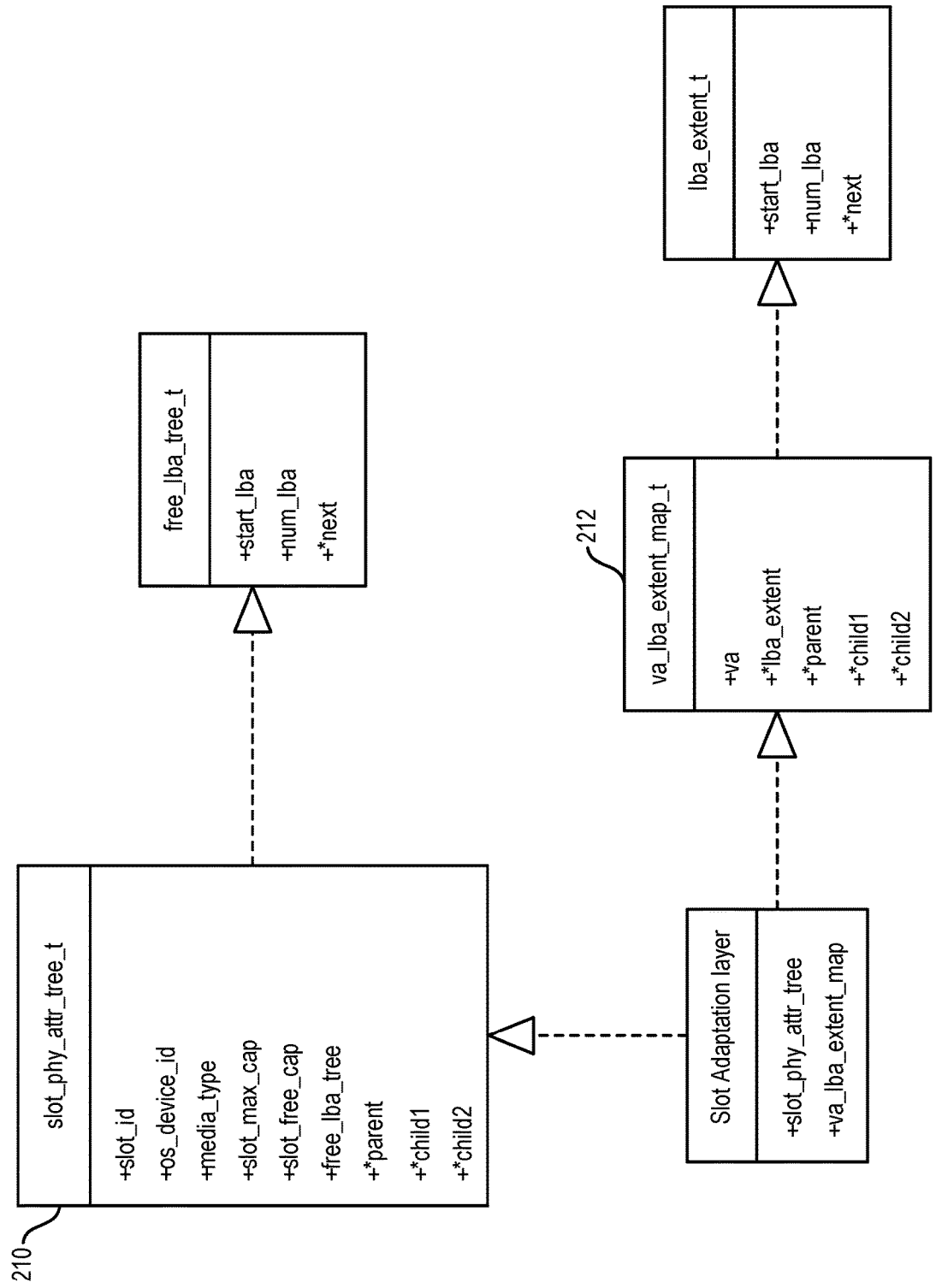

FIG. 8 shows various data structures created and used by the slot layer 200. The data structures can be stored to a database 208 (shown in FIG. 4) associated with the slot layer 200. The slot layer 200 includes a data structure 210 for each data storage device 128 that includes information about the given data storage device 128. The information can include a unique slot_id number for the data storage device 128 and information about the data storage device's operating system, type of storage media, maximum capacity, available capacity, and available physical addresses, among other things. This data structure 210 can be sent to the media link layer 170.

As mentioned above, a mapping of the fragments' virtual addresses and the physical addresses is stored, and that mapping can be stored according to another data structure 212. Once a fragment 178 is assigned a physical address on a data storage device 128, the fragment 178 can be stored to that physical address.

Initialization of Enclosure

Figure 9:
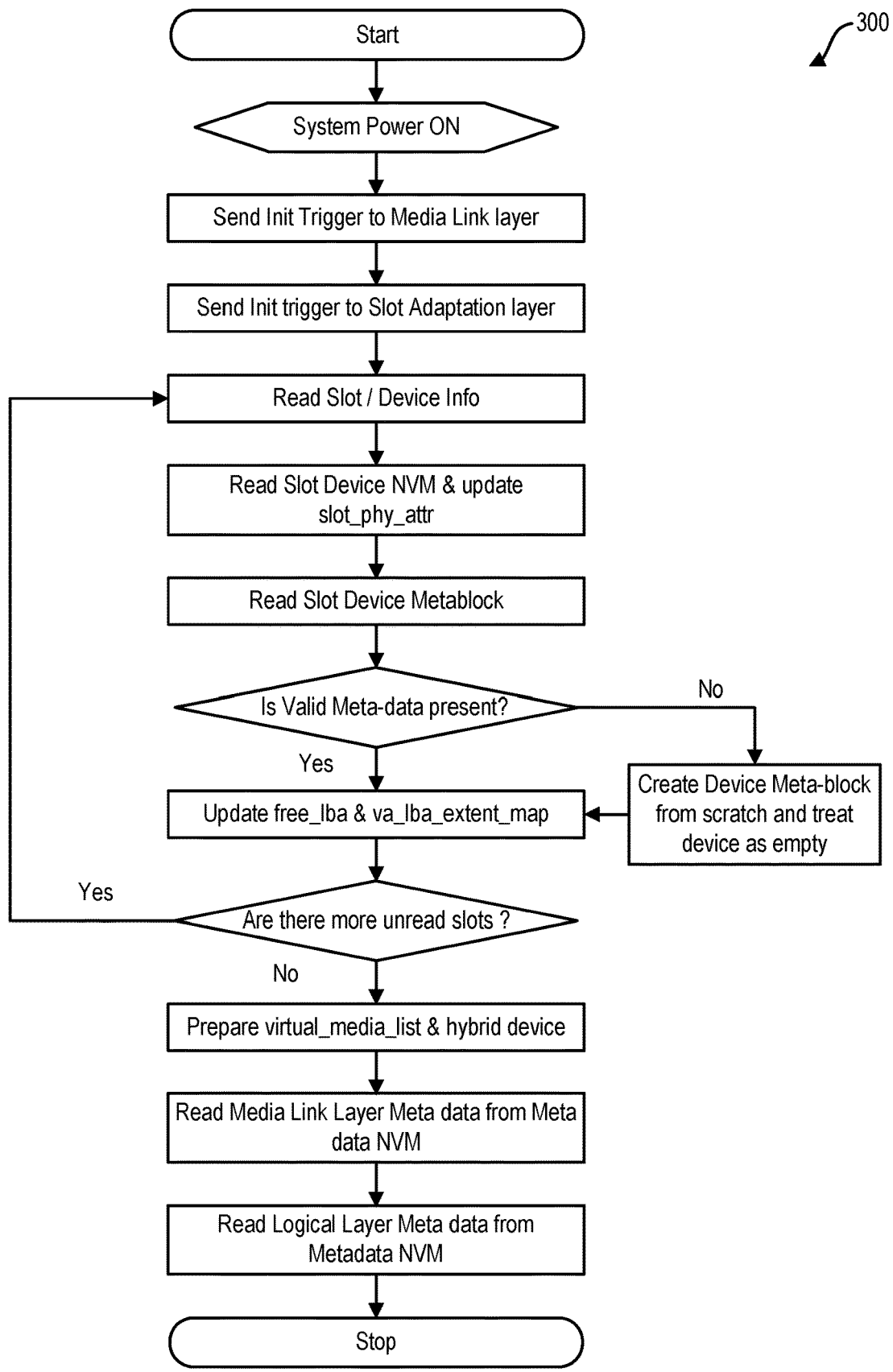
FIG. 9 shows a flowchart for initializing the enclosure, in accordance with certain embodiments of the present disclosure.

When the enclosure 100 is powered up, the enclosure 100 can begin an initialization routine that prepares the enclosure 100 for operation. FIG. 9 show a flowchart 300 of steps that can be taken during initialization of the enclosure 100. These steps can also be taken periodically during operation of the enclosure 100.

When the enclosure 100 is powered on, the enclosure 100 can initiate triggers or queries to both the media link layer 170 and the slot layer 200. The triggers or queries can initiate a routine where information (e.g., id number, available capacity) from each slot or data storage device 128 is read and collected. The routine can be operated until each data storage device 128 in the enclosure 100 is accounted for.

Information in the relevant data structures described above can be updated based on the information received from the data storage devices 128. As such, the information in the data structures can be current and ready to be used for writing, reading, and erasing data operations, which are described in more detail below. During the writing, reading, and erasing data operations, the various data structures (e.g., mappings, lists) can be updated such that the data structures have the most up-to-date information about the data storage devices 128 and data stored to the data storage devices 128.

Writing Data

Figure 10A:
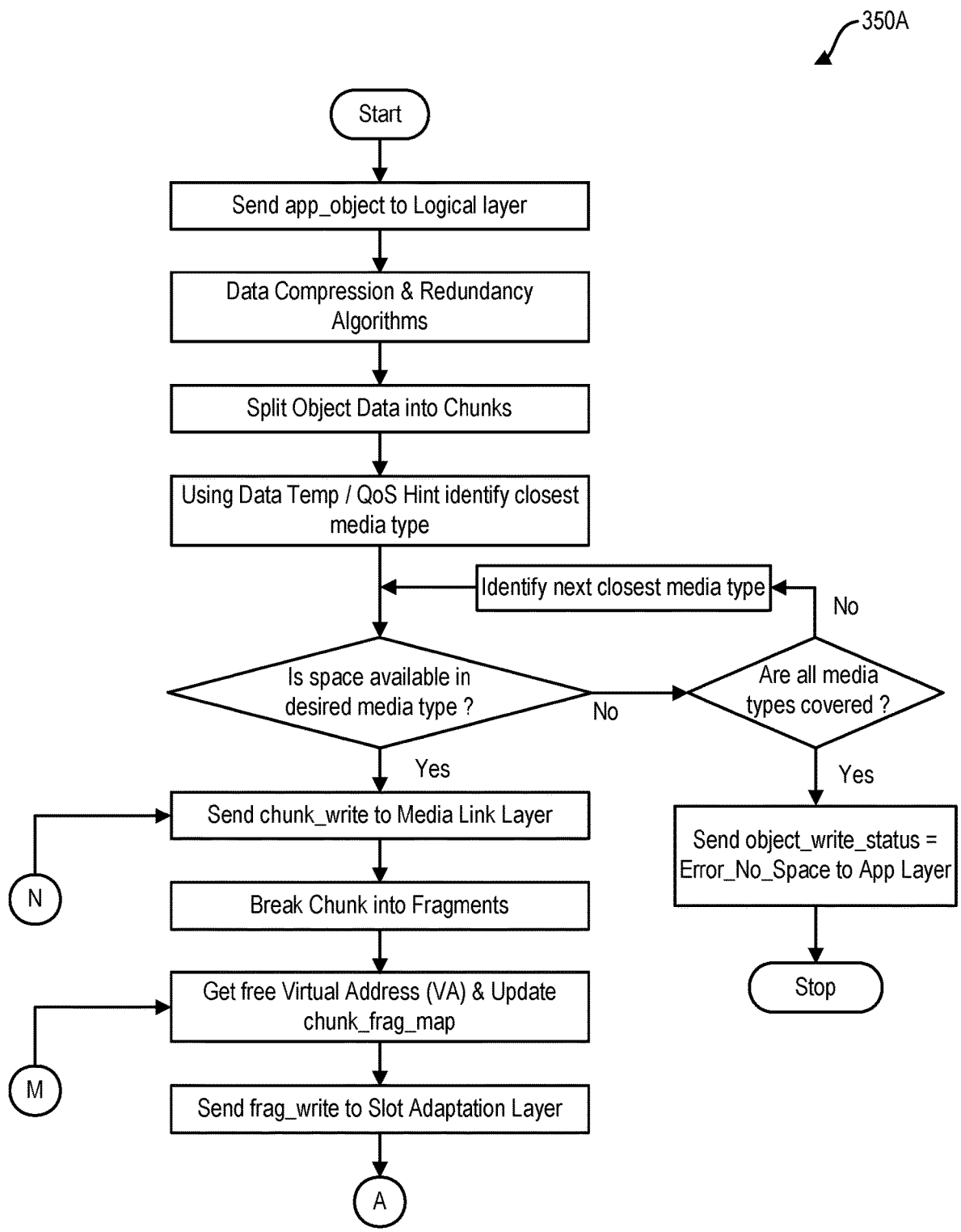
FIGS. 10A-12 show flowcharts for performing respective write, read, and erase data operations, in accordance with certain embodiments of the present disclosure.
Figure 10B:
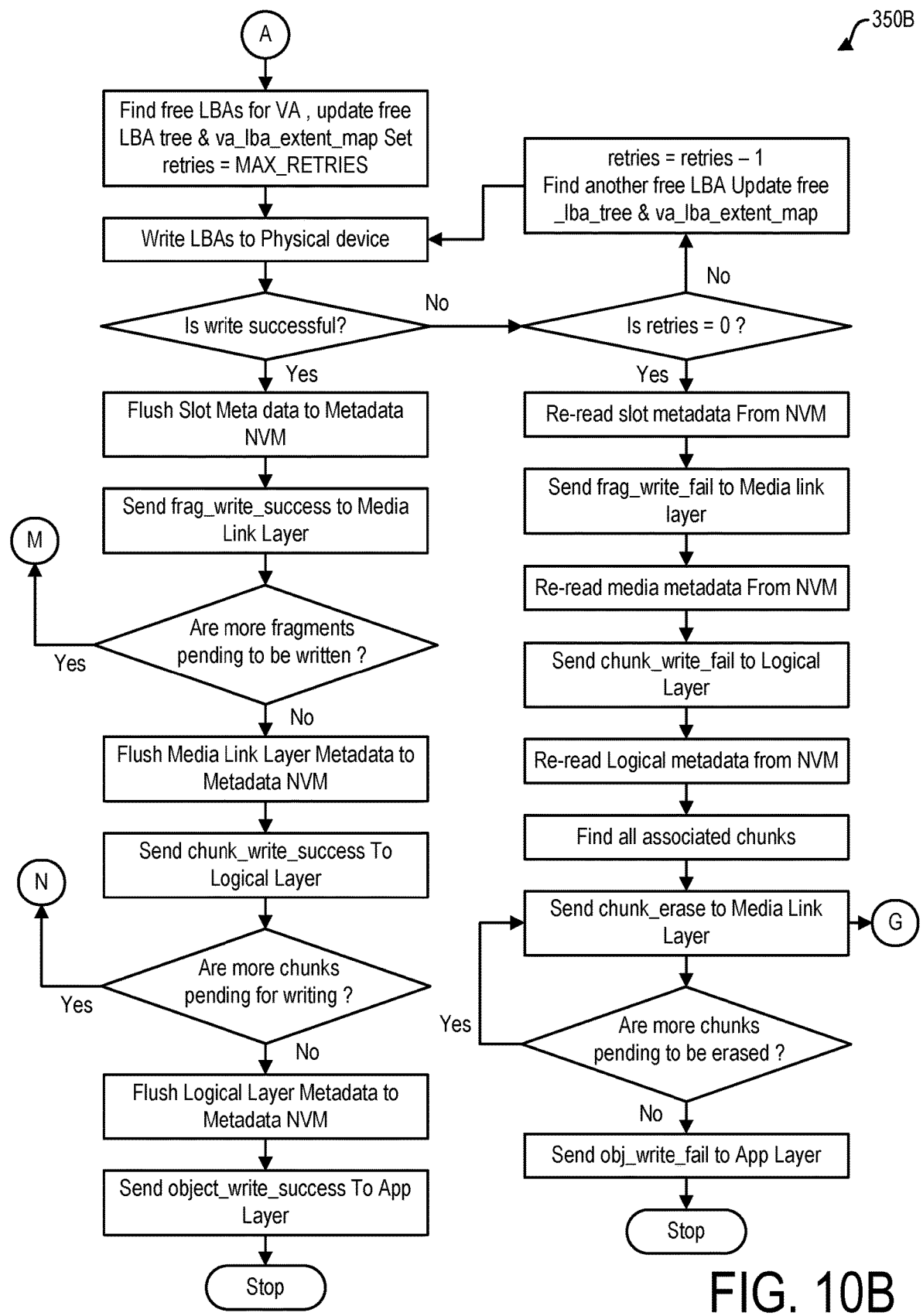

FIGS. 10A and 10B show flowcharts 350A and 350B of steps that can be taken to write data to one or more of the data storage devices 128 in the enclosure 100. The writing data operation starts with the host 12 sending data (e.g., a key-value pair, per object storage protocols) to the logical layer 160 of the enclosure 100.

The logical layer 160 can apply, to the extent applicable, various data compression, encryption and/or redundancy algorithms to reduce the size of the incoming data, secure the incoming data, and to backup or replicate the incoming data. The key-value pair is split into smaller chunks 158 of data. Using information (e.g., metadata) sent by the host such as data temperature, the logical layer 160 determines which type of storage media each chunk 158 should be stored. Once a type of storage media is determined, the logical layer 160 determined whether there is enough available capacity in the given type of storage media in the enclosure 100 to store the chunks 158. The logical layer 160 can cycle through the types of storage media until it can be determined that enough capacity is available. If not, the logical layer 160 can generate an error message and send the message to the host 12.

The chunks 158 can then be sent to the media link layer 170. The media link layer 170 splits the chunks 158 into smaller fragments 178. The media link layer 170 then determines which virtual addresses are available, assigns the fragments 178 individual virtual addresses, and sends the fragments 178 to the slot layer 200.

Moving to FIG. 10B, the slot layer 200 finds free physical addresses to assign the virtual addresses. Once an assignment is made, the fragments 178 can be written to the assigned data storage device 128. In certain embodiments, the slot layer 200 continues to retry to write the fragments 178 in the event of an error. If the maximum number of retries is reached, the slot layer 200 can initiate a routine (as outlined on the left-hand side of FIG. 10B) that eventually leads to sending an error message to the host 12. If the fragments 178 are successfully written to the assigned physical address and data storage device 128, the layers can determine whether additional data is to be written and, once complete, send a message to the host 12 that the data was successfully written.

Reading Data

Figure 11:
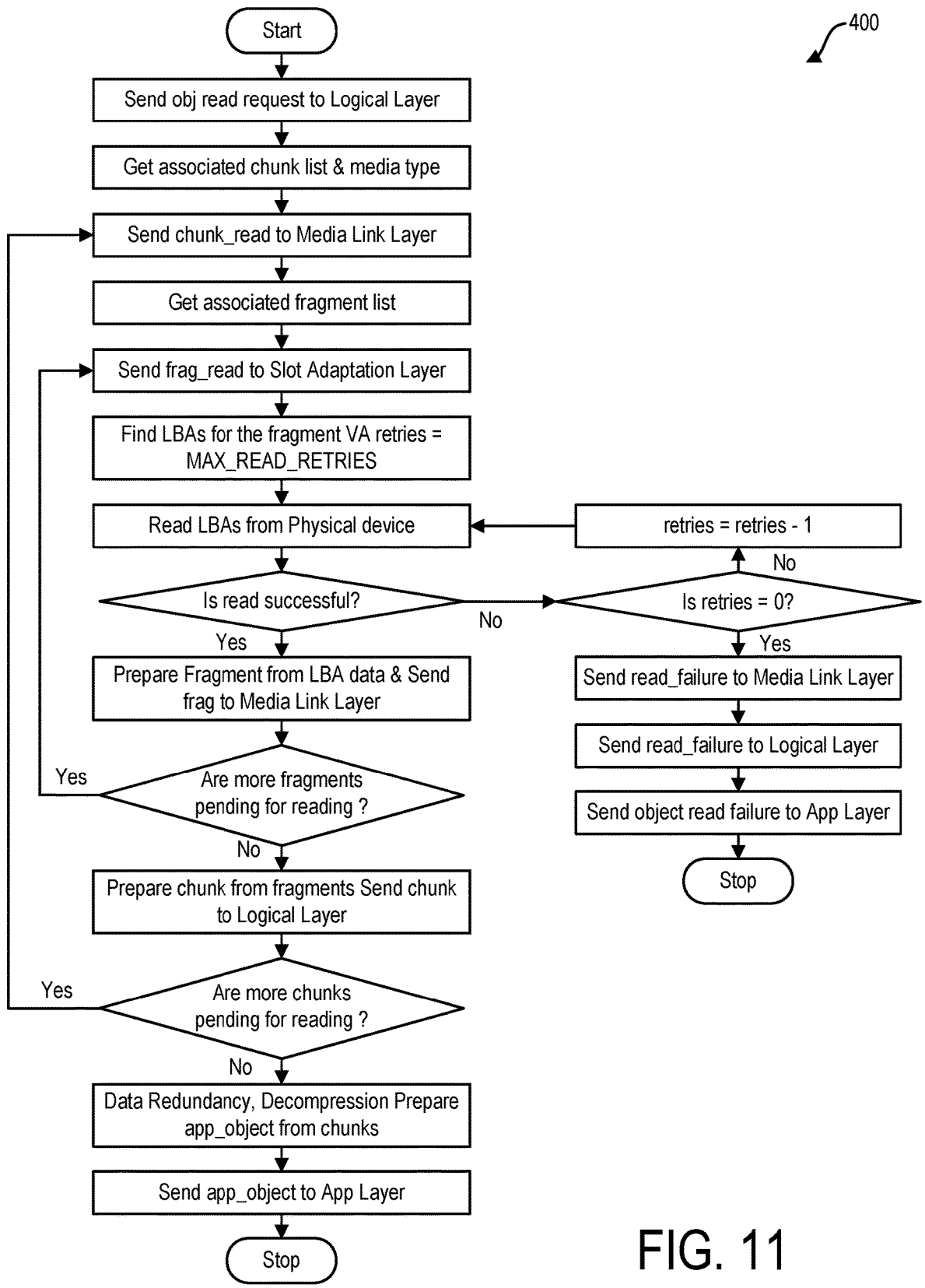

FIG. 11 shows a flowchart 400 of steps that can be taken to read data from one or more of the data storage devices 128 in the enclosure 100 and send the read data to the host 12. The writing data operation starts with the host 12 sending a request for data (e.g., a key-value pair) to the logical layer 160 of the enclosure 100.

Using the mappings between key-values, chunks 158, and fragments 178, the layers determine which physical addresses the requested data is stored. Once the physical address is determined, the fragments 178 can be read. In certain embodiments, the slot layer 200 continues to retry to read the fragments 178 in the event of an error. If the maximum number of retries is reached, the slot layer 200 can initiate a routine (as outlined on the left-hand side of FIG. 11) that eventually leads to sending an error message to the host 12. If the fragments 178 are successfully read from the assigned physical address and data storage device 128, the layers can determine whether additional data is to be read. The logical layer 160 can apply, to the extent applicable, various data decompression and/or data decryption algorithms to the retrieved data. Then, the read data can be sent to the host 12.

Erasing Data

Figure 12:
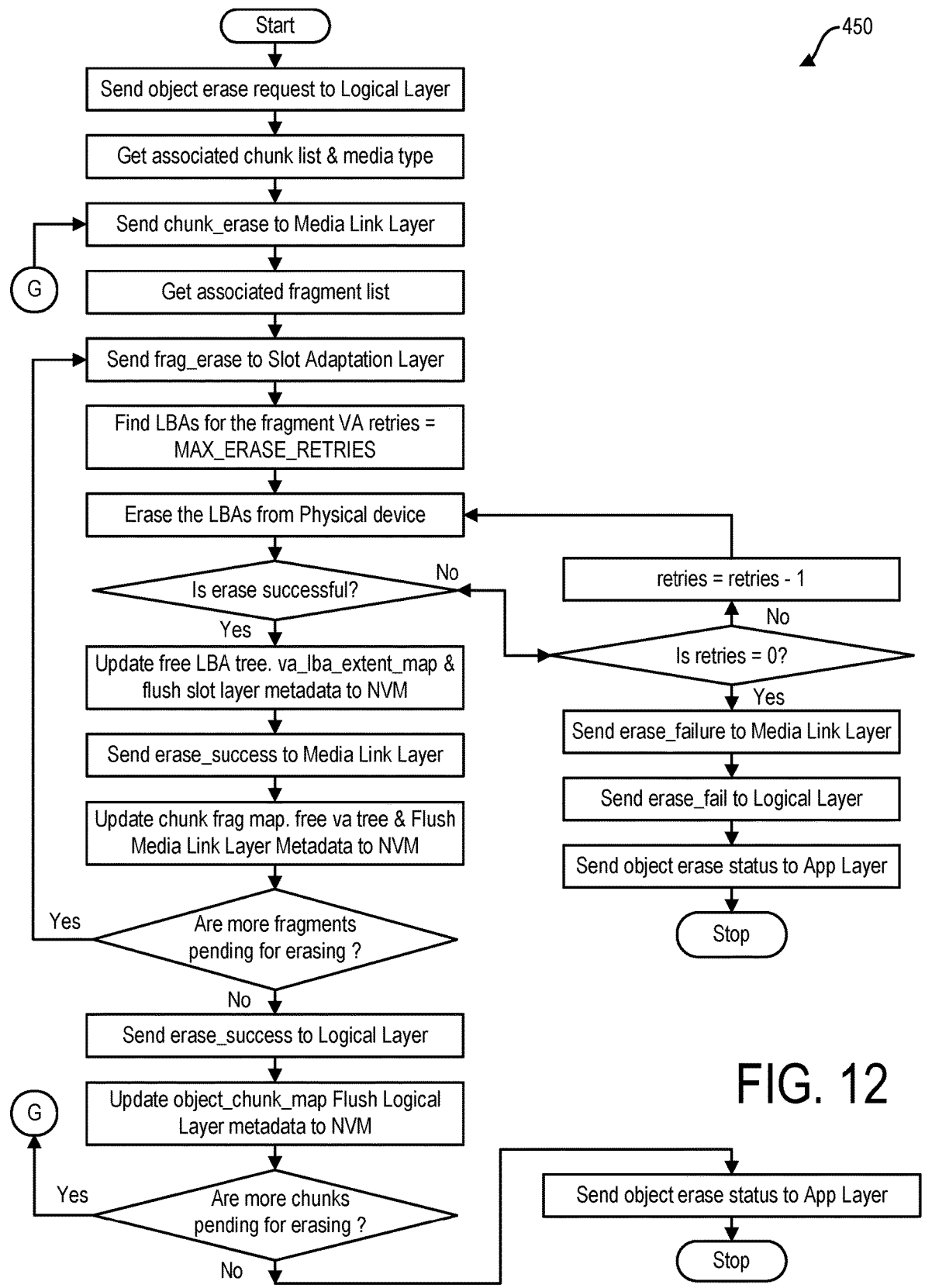

FIG. 12 shows a flowchart 450 of steps that can be taken to erase data from one or more of the data storage devices 128 in the enclosure 100. The data erasing operation starts with the host 12 sending a request to the logical layer 160 to erase data.

Using the mappings between key-values, chunks 158, and fragments 178, the layers determine which physical addresses the to-be-erased data is stored. Once the physical address is determined, the fragments 178 can be erased or overwritten. In certain embodiments, the slot layer 200 continues to retry to erase the fragments 178 in the event of an error. If the maximum number of retries is reaches, the slot layer 200 can initiate a routine (as outlined on the left-hand side of FIG. 12) that eventually leads to sending an error message to the host 12. If the fragments 178 are successfully erased, the layers can determine whether additional data is to be erased and, once complete, a message indicating the successful erase can be sent to the host 12.

CONCLUSION

By combining the various features and approaches described above in the enclosure 100, the enclosure 100 can provide an object storage data storage system that can utilize a variety of types of data storage devices. These data storage devices can include "fast" storage media such as SSDs, NVDIMMs, and persistent memory; "traditional" high-capacity storage media such as HDDs and optical disks; and relatively cheaper but slower storage media such as magnetic tape. In certain embodiments, the enclosure 100 incorporates sub-systems such as JBODs, JBOFs, PODS, RBODs, etc. The enclosure 100 can essentially replicate the functions of what previously would require multiple distinct enclosures. As such, the enclosure 100 can reduce the cost of data storage by obviating the need for multiple enclosures, each with their own software, processors, and hardware such as the chassis or physical enclosure itself.

The primary functions of the enclosure 100 can be managed by a central processing integrated circuit. The central processing integrated circuit can manage the amount of power directed to the various electrical components of the enclosure 100 and how data is communicated to and from the data storage devices 128, as described above. For example, the central processing integrated circuit can operate and manage the different layers and their functions described above.

In certain embodiments, the central processing integrated circuit comprises a field-programmable gate array (FPGA). In other embodiments, the central processing integrated circuit comprises an application-specific integrated circuit (ASIC). The central processing circuit can be positioned on a printed circuit board (e.g., motherboard) positioned in the controller sub-enclosure 104.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A system comprising:
   memory; and
   one or more processors programmed to operate a logical layer, a media link layer, and a slot layer,
   the logical layer programmed to receive object data in the form of key-value pairs from a host according to an object storage protocol and split the object data into data chunks,
   the media link layer programmed to split the data chunks into smaller sets of data and to map the smaller sets of data to respective virtual media addresses, and
   the slot layer configured to map the virtual media addresses to physical addresses of data storage devices.

2. The system of claim 1, further comprising:
   the data storages devices, which include a first data storage device comprising a first type of data storage media and a second data storage device comprising a second type of data storage media.

3. The system of claim 2, wherein the first type of data storage media is magnetic tape, wherein the second type of data storage media is a magnetic recording hard disk.

4. The system of claim 2, wherein the first type of data storage media is a magnetic medium, wherein the second type of data storage media is an optical medium.

5. The system of claim 1, wherein the physical addresses are logical block addresses and/or sector addresses.

6. The system of claim 1, wherein the media link layer is communicatively coupled between the logical layer and the slot layer.

7. The system of claim 1, wherein each of the smaller sets has a data size that is the same as a size of a block format of one of the data storage devices.

8. The system of claim 1, wherein the media link layer is configured to map the object data to virtual media addresses based, at least in part, on metadata received from the host.

9. The system of claim 8, wherein the metadata indicates a data temperature and a quality of service.

10. The system of claim 1, wherein the logical layer is configured to compress the object data.

11. The system of claim 1, wherein the media link layer is programmed to virtualize groups of data storage devices based on the type of data storage devices.

12. The system of claim 11, wherein the media link layer is programmed to virtualize groups of data storage devices based on the type of data storage devices such that each virtual group is viewed as a single data storage device.

13. The system of claim 11, wherein the logical layer is programmed to determine what virtual group the data chunks should be stored to.

14. The system of claim 11, wherein the logical layer is programmed to determine what virtual group the data chunks should be stored to based on metadata received from the host.

15. The system of claim 14, wherein the metadata indicates a data temperature.

16. The system of claim 1, wherein each of the logical layer, the media link layer, and the slot layer have memory dedicated to the respective layer.

17. The system of claim 1, wherein the logical layer is not configured to select a particular data storage device for writing data or retrieving data.

18. The system of claim 1, wherein some of the data chunks created from the object data are stored to a first data storage device, wherein some of the other data chunks created from the object data are stored to a second data storage device.

19. The system of claim 1, wherein some of the data chunks created from the object data are stored to a first type of data storage device, wherein some of the other data chunks created from the object data are stored to a second type of data storage device.

20. The system of claim 1, wherein the logical layer is associated with a first dedicated database, wherein the media link layer is associated with a second dedicated database, wherein the first dedicated database stores a first data mapping structure indicating how the key-value pairs are mapped to the data chunks, wherein the second dedicated database stores a second data mapping structure indicating how the data chunks are mapped to the virtual media addresses.

* * * * *